June 18, 1957 W. F. DEHN 2,796,487
SNAP ACTION MECHANISM
Filed Feb. 9, 1955 3 Sheets-Sheet 1
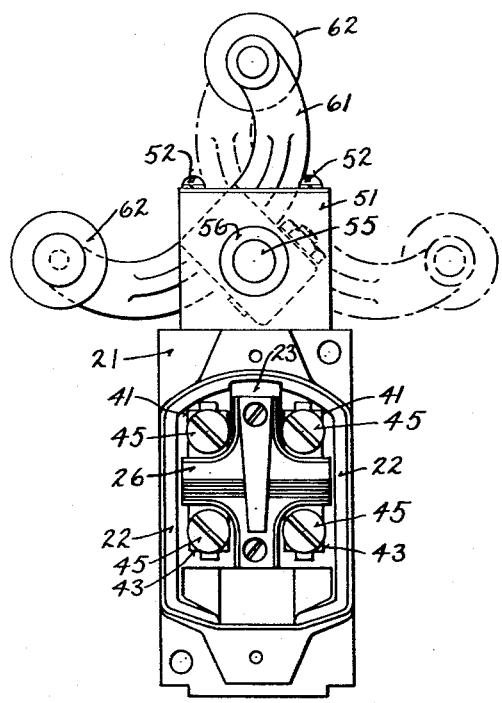
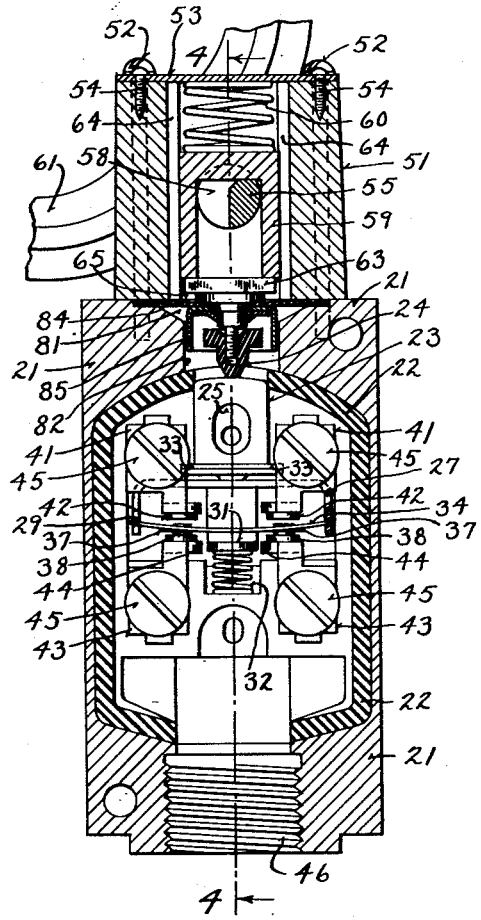
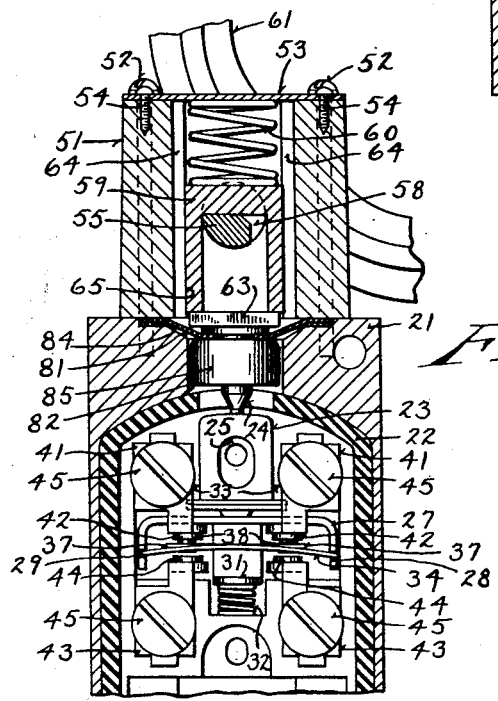
INVENTOR
WILLIAM F. DEHN
BY
ATTORNEY

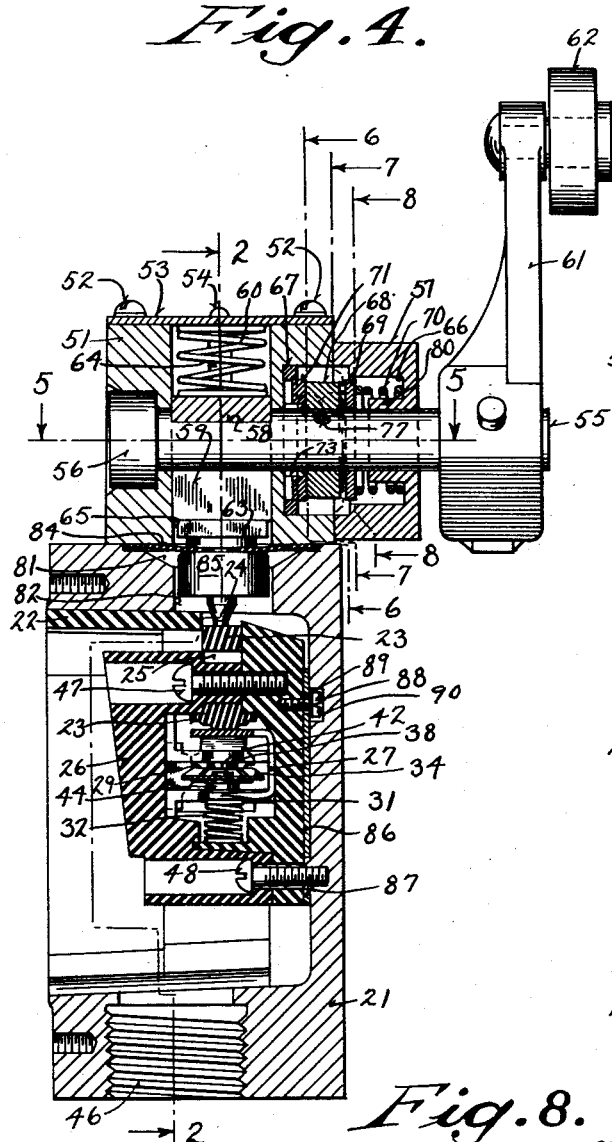
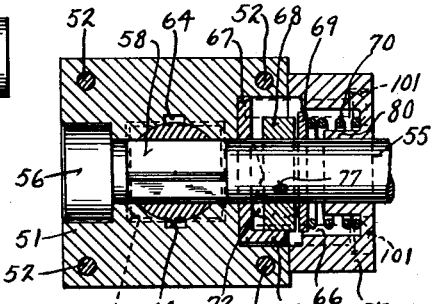
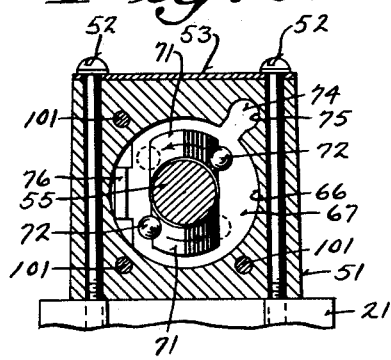
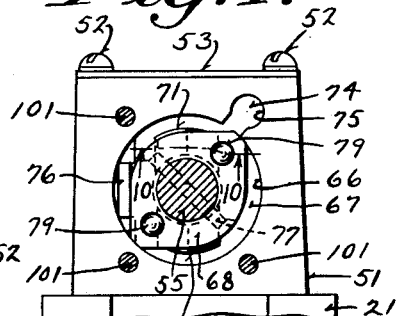
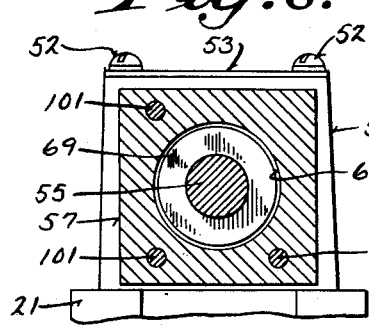
INVENTOR
WILLIAM F. DEHN
BY
ATTORNEY June 18, 1957    W. F. DEHN    2,796,487
SNAP ACTION MECHANISM
Filed Feb. 9, 1955    3 Sheets-Sheet 3

INVENTOR
WILLIAM F. DEHN
BY
ATTORNEY

United States Patent Office 2,796,487
Patented June 18, 1957

2,796,487
SNAP ACTION MECHANISM

William F. Dehn, Wauwatosa, Wis., assignor to Allen-Bradley Company, Milwaukee, Wis., a corporation of Wisconsin Application February 9, 1955, Serial No. 487,096

3 Claims. (Cl. 200—67)

This invention relates to a snap-action mechanism, more particularly a snap-action actuating mechanism for a snap-action electrical switch, or other actuated mechanism. More particularly it resides in such a mechanism including: a rotatable member capable of rotation under external actuation; means for utilizing this rotation to actuate the actuated mechanism; one or more sets of rolling elements (an even number, preferably two, of such elements to each set) non-adjacent to the axis of the rotatable member; cam means capable of shifting the sets of rolling elements axially in unison; means for shifting, or being shifted by, the sets of rolling elements angularly about said axis relatively with respect to the cam means; and resilient means to maintain the sets of rolling elements in contact with the cam means; the sets of rolling elements having at least one position of equilibrium in the course of the rotation of the rotatable member; whereby prior to this position, the set or sets of rolling elements, under the influence of the cam means, store-up energy in the resilient means, which energy as the sets of rolling elements leave this position of equilibrium, causes the rotatable member to suddenly overrun its external actuation, and turn with great rapidity. An important feature of the above is the reduction of friction accomplished by having an even number of rolling elements to each set.

In one form of the invention, the rotation of the rotatable member is back-and-forth rotation, and the snap-action occurs at about the mid point of each limited rotation.

Invention also inheres in the combination of an even number of rolling elements, the shifting means, the cam means, and the resilient means, as a low-friction snap-action mechanism, not necessarily maintained-type, for producing, at a predetermined relative position of the shifting means and the cam means, a snap-action motion (independent of further external actuation) by one of these two means with respect to the other.

In most maintained-type actuating devices, the limited rotation of the rotatable member in each direction is impelled by a driving connection with some relatively slow moving part external to the device, and this impelling persists throughout the limited rotation. Thus such devices cannot control, with the desired degree of fineness, the exact point in the cycle at which snap-over occurs. Whereas, in the device of the present invention, the rotation of the shaft, upon reaching a predetermined snap-point, abruptly overruns the external impeller, thus precisely fixing the point of actuation.

Some such devices seek to attain this result by employing complicated mechanisms, for example release-catches; most of which mechanisms are subject to wear and short life due to friction. Even such devices are not very precise, as to the exact point in the cycle at which tripping occurs, and this point is altered and rendered more uncertain by frictional wear.

Accordingly it is the object of this invention to provide a snap-action maintained-type actuating mechanism which is not only precise, but also is simple and subject to minimum wear.

The chief use envisioned for the mechanical snap-action maintained-type actuating mechanism is to actuate another snap-action mechanism, such as an electric switch. This use of one snap-action mechanism to actuate another, increases the precision of the exact point in the cycle at which the snap-over of the actuated device occurs. If in the course of the limited rotation of the rotating member in either direction, this rotating member reaches the position at which it actuates the snap-over of the actuated device before the actuating mechanism reaches the position of its own snap-over, then its own snap-over will accomplish nothing.

So it is essential that the differential between the two points at which snap-over occurs in the actuating mechanism, must be operationally materially less than the differential between the two points at which snap-over occurs in the actuated device.

Accordingly a further object of the present invention is to provide a mechanical actuating device having a very small differential.

These and other objects and advantages of this invention will appear in the description to follow. In the description reference is made to the accompanying drawings which form a part hereof, and in which there is shown by way of illustration, and not of limitation, a specific form in which this invention may be embodied.

In the drawings:

Fig. 1 is a front elevation of the mechanical actuating device of this invention, mounted on top of the actuated switch.

Fig. 2 is an enlarged vertical section of the same, viewed as though cut along the line 2—2 of Fig. 4, and showing the switch mechanism with cover 26 removed. The parts are in the position they occupy when the forked roller-lever is tilted in the full-line position of Fig. 1.

Fig. 3 is the same as Fig. 2, except that the parts are in the position they occupy when the forked roller-lever is tilted in the dotted-line position of Fig. 1, and that the diaphragm-assembly is shown in elevation, instead of in section.

Fig. 4 is a vertical section, viewed as though cut along the line 4—4 of Fig. 2, but with cover 26 in place as in Fig. 1.

Fig. 5 is a horizontal section, viewed as though cut along the line 5—5 of Fig. 4, but showing the shaft and its bearing in plan.

Fig. 6 is a vertical section, viewed as though cut along the line 6—6 of Fig. 4, and showing the cam-plate in elevation.

Fig. 7 is a vertical section, viewed as though cut along the line 7—7 of Fig. 4, and showing the operating-head casing and ball-cage in elevation.

Fig. 8 is a vertical section, viewed as though cut along the line 8—8 of Fig. 4, and showing the spring-plate in elevation.

Figure 9:
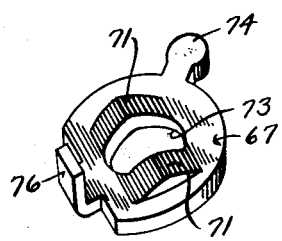
Fig. 9 is a view in perspective of cam-plate 67.

Referring now to the drawings, there will first be described a snap-switch, actuated by actuating mechanism to be later described.

Figure 13:
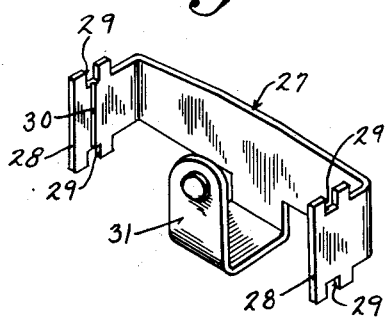
Fig. 13 is a view in perspective of carrier 27.

There is shown a case 21 formed of a suitable material such as metal, and a housing 22, formed of a suitable insulating material with an interior configuration adapted to receive the elements of the switch and to guide the movement of certain movable members thereof. A vertically movable plunger 23 is received within the upper central portion of the housing 22 and is closely surrounded at its sides and back. The plunger 23 is provided with an upper face, exposed for engagement by an actuator point 24, and also with an elongated central opening 25 to receive a portion of cover 26, hereinafter more particularly described. The lower end of the plunger 23 rests upon a resilient toggle carrier 27 disposed within the central cavity of housing 22. As is shown more clearly in Figure 13 the carrier 27 is a bracket with a depending supporting abutment 28 at each end. Each abutment 28 is notched as at 29 on opposite sides and extending between the notches 29 and across the inner face of the abutments 28 is a transverse groove 30 terminating at the notches 29. A spring seat 31 extends downwardly from the back of the midsection of the carrier 27 to retain the upper end of a biasing spring 32 held in place within a recess in the housing 22. The carrier 27 is urged upwardly by the action of the spring 32 into the position shown in Figure 2. Upward travel of the carrier 27, in response to the bias of the spring 32, is limited by stops 33 that form a part of the housing 22 and which engage the rectangular flange at the bottom of the plunger 23.

Figure 14:
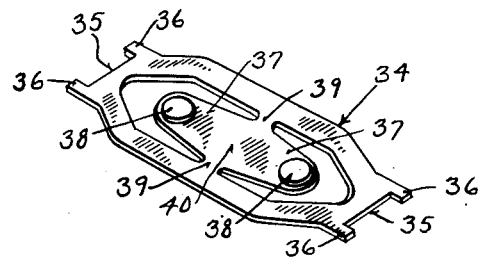
Fig. 14 is a view in perspective of leaf 34.

Inserted between the abutments 28 of the carrier 27 is a thin resilient leaf 34 having the configuration more clearly shown in Figure 14. The leaf 34 is of a length slightly greater than the distance between the valleys of the grooves 30 in the abutments 28 when the carrier 27 is unstressed. An edge 35 at each end of the leaf 34 is received within a groove 30 in the carrier 27, and a pair of ears 36 flanking the edges 35 are received within the respective notches 29 in the supporting abutments 28. Upon inserting the leaf 34, the abutments 28 are deflected slightly outwardly, and the leaf is placed under compression as a hinged-end column stressed beyond the point where bending occurs, and hence the leaf assumes a bowed configuration as shown in Figures 2 and 3. The leaf 34 is equivalent to a toggle with a knee 39 at the center of bending. The extent of the toggle bow will depend upon the dimensions and spring rates of both the resilient carrier 27 and the leaf 34. Portions of the leaf 34 are cut away to form a pair of movable contact blades 37 that merge with the knee portion 39, and the knee 39 includes a pair of narrow necks 40 connecting the blades 37 with the remaining portions of the leaf 34. Thus the blades 37 form a unitary whole with the leaf 34, and each blade is deflectable at its free end which mounts a movable contact 38 on both faces of the blade.

A pair of upper stationary contact terminals 41 are mounted in the housing 22 on either side of the plunger 23. Each contact terminal 41 supports a stationary contact 42 disposed above one of the movable contacts 38. A pair of lower stationary contact terminals 43 are likewise mounted in the housing 22, and are disposed on either side of the cavity which houses the spring 32. Each lower contact terminal 43 mounts a stationary contact 44 disposed beneath one of the movable contacts 38. Terminals screws 45 are received by each contact terminal 41, 43 for convenient connection with electrical conductors, which can be led in through orifice 46.

To retain the plunger 23, the spring 32, and the carrier 27, in position, a four-armed cover 26, shown in place in Figures 1 and 4 is secured to the housing 22 by means of a screw 47. The complete switch assembly is secured to the metallic case 21 by means of a screw 48.

In Fig. 2 there is shown the plunger 23 and carrier 27 in upper position, to which they are urged by the spring 32, in the absence of pressure on the top of plunger 23.

In this position the leaf 34 is bowed downwardly, and the movable contacts 38 press upon the lower stationary contacts 44, with the contact blades 37 deflected, but not so much as the leaf itself, to provide contact force.

In Fig. 3 there is shown the plunger 23 and carrier 27 in lower position, to which they are urged by pressure on top of the plunger 23, in opposition to the spring 32. In this position the leaf 34 is bowed upwardly, and the movable contacts 38 press upon the upper stationary contacts 42, with the contact blades 37 deflected, but not so much as the leaf itself, to provide contact force.

It should be noted that the upper position of the plunger 23 closes the lower contacts, and that the lower position of the plunger closes the upper contacts.

Characteristic of this mechanism is the fact that the snap-over from one contact-closure to the other, occurs well in advance of dangerous reduction of contact force in the contact-closure departed from.

Turning now to the mechanical actuating mechanism shown at the top of Figs. 1, 2, 3, and 4, and in Figs. 5, 6, 7, and 8.

51 is the operating head casing, formed of any convenient material such as metal. It can be secured to case 21 (oriented in any one of four directions) in any convenient manner such as screws 52, which also serve to hold in place cover plate 53. When casing 51 is not attached to case 21, cover plate 53 is held in place by two small drive screws 54.

Across casing 51 there extends shaft 55, journalled in bronze bearing 56, and bushing 57. The bronze bearing is a press-fit. The bushing is secured to casing 51 as by screws 101. A portion 58 of shaft 55 is cut away, so that the remainder of the shaft at that point will constitute a cam to reciprocate follower 59 against spring 60, which in turn reacts against cover plate 53.

One end of shaft 55 projects from casing 51, and to this end is rigidly secured a forked lever 61, carrying two rollers 62. This lever can be oscillated through about 90° from one to the other of the two positions shown in Fig. 1 (the means for limiting this oscillation will be described hereinafter), by any convenient means (such as dogs) not shown (on some reciprocating element, now shown) engaging the rollers 62, all this being well known in the art and not forming a part of the present invention, it only being important to note that the construction should be such that the rollers can overrun the dogs. Many alternatives to the dogs and rollers and forked lever, are well known in the art.

Follower 59 is divided at the bottom, to straddle shaft 55, and as shown is cylindrical in general conformation so as to reciprocate snugly in a cylindrical hole 65, preferably squared at its bottom end to accommodate the actuator head 63, which will be mentioned hereinafter.

Running the length of this cylindrical hole are two air-vents 64, to equalize the air-pressure above and below the follower 59, and thus prevent a build-up of air-pressure above and below the top of the follower from interfering with the follower's free reciprocation.

In a cavity 66 in casing 51 and bushing 57, proceeding from left to right in Figs. 4 and 5, is a cam-plate 67, a ball-cage 68, a spring-plate 69, and a spring 70. One of the cam-plate or cage should be held securely against rotation and translation with respect to casing 51, and the other against rotation and translation with respect to shaft 55. As shown, the cam-plate is the former and the cage the latter. This choice is preferable, but not essential.

Figure 12:
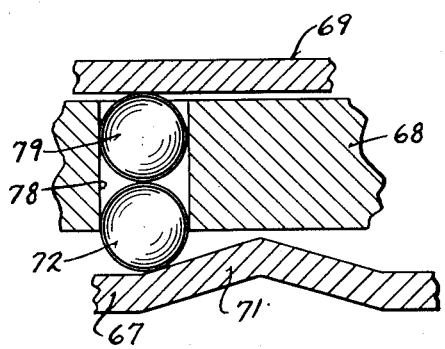
Fig. 12 is the same, but showing the parts with the balls in the position of Fig. 3.

The cam-plate 67 will be best understood by reference to Fig. 9. It carries a camway in two parts 71 on which roll the adjacent balls 72. It has a central hole 73, to embrace shaft 55. It has a key 74, to fit snugly in keyway 75, and a periphery to fit snugly in the extreme left-hand end of cavity 66; these fits securing it against rotation. It also has a stop 76, the object of which will appear shortly hereinafter. In Fig. 6 the full-line positions of adjacent balls 72 are their cycle-starting positions with shaft 55 oriented as in Fig. 2; see also Fig. 10. The dotted-line positions are their reverse cycle-starting positions with shaft 55 oriented as in Fig. 3; see also Fig. 12.

It should be noted that the two parts 71 of the camway are similar so as to produce similar simultaneous motion of the two sets of balls 72, 79. Also that the change in slope of each is abrupt at the critical point. This is highly advisable, even if the camway be of some other shape, such for example as flat-topped, rather than peaked as shown.

The cage 68 is shown in Fig. 7. It is secured against translation and rotation with respect to shaft 55 in any convenient manner, as by pin 77, and is of such shape as, by engaging stop 76, to limit rotation of shaft 55 to about the 90° previously mentioned. If continuous (rather than reciprocating) rotation be employed, these two cooperating stop means should of course be omitted.

Cage 68 also contains a plurality of axially extending holes 78 (preferably two) of such diameter as each to loosely contain two balls 72, 79. The relative axial positioning of cam-plate 67 and cage 68, and the thickness of the latter should be such, with respect to the diameter of the balls, as not to permit either ball to obtrude more than somewhat less than half way from its hole at any time during the cycle. Other rolling means than balls could be employed.

As seen from Fig. 8 the spring-plate 69 is a simple flat annulus, serving as a track for balls 79 to roll on. This spring-plate could also bear camways, either supplementing those on cam-plate 67, or in lieu thereof; but this would require slidably keying the spring-plate to the casing-bushing assembly 51—57, or to the shaft, whichever cam-plate 67 was keyed to, and this would not be as advisable as the construction shown.

Around an inwardly projecting portion 80 of bushing 57, which projection serves as a bearing for shaft 55 and as a spring-guide, is the spring 70, which bears against bushing 57 and forces spring-plate 69 against balls 79, to maintain balls 72 in contact with the camway.

The reason for a plurality of holes 78, rather than merely one hole, in cage 68, is to balance spring-plate 69 against tilting. More than two holes 78 and a corresponding number of cooperating parts 71 of the camway could be employed, preferably fairly evenly spaced about shaft 55. They must be exactly evenly spaced, if continuous (rather than reciprocating) rotation be employed.

Although cage 68 could be thick enough compared with the size of the balls, and holes 78 could be correspondingly long, so as to accommodate any reasonable number of balls, from one up; yet an even number of balls (preferably two) per hole is preferable to reduce friction, because the extreme balls of an even number will roll on cam-plate 67 and spring plate 69 respectively, with very little slippage. This reduced friction not only reduces wear thus prolonging the life of the mechanism and the uniformity of positions of actuation, but also reduces the differential to a very small amount.

To further reduce friction, it is advisable that casing-bushing assembly 51—57, be oil sealed. To this end, there is provided the diaphragm assembly which will now be described. See Fig. 3 for elevation, and Fig. 2 for vertical section.

In the top of case 21 of the switch assembly is a hole 81, the upper portion of which is preferably a very shallow cylindrical plinth, the intermediate portion of which is preferably an inverted truncated cone, and the lower portion of which is preferably cylindrical. This hole opens just above a hole 82 in the top of housing 22, just above the top of switch plunger 23.

The square bottom portion of follower-hole 65 in casing 51, is loosely occupied by the square top of actuator-head 63. A narrow male-threaded projecting portion of head 63 extends downwardly through the center of a circular diaphragm 84 of flexible stretchable oil-impervious material such as rubber, and thence through the top of an inverted cylindrical cup 85. Onto this threaded portion is screwed female-threaded actuator-point 24, thus clamping diaphragm 84 between actuator-head 63 and actuator-point 24. The outer edge of diaphragm 84 is in turn clamped between the lower surface of casing 51 and the upper surface of case 21. Thus the diaphragm assembly, thus described, effectively seals off the escape of oil from the bottom of follower-hole 65 in casing 51, yet permits downward motion of follower 59 to be freely transmitted to plunger 23, and the upward motion of plunger 23 to be freely transmitted to follower 59. In other words, the follower and the plunger with the actuator between them reciprocate vertically as a unit.

One final detail should now be mentioned. In Fig. 4, there is shown an adjusting plate 86, lying between the back wall of housing 22 and the metal case 21 which contains it. This adjusting plate 86 lies in a vertical groove in the back of housing 22, and is about one-third as wide as it is long. Through it pass two holes, the lower of which provides a snug fit with boss 87 which projects inwardly from the back wall of case 21. The upper hole is larger in a vertical direction than screw 88, to permit vertical adjustment of plate 86 with respect to housing 22. Further to permit such adjustment, the holes in cover 26 and housing 22 through which screw 48 passes are likewise larger in a vertical direction than this screw. There is also a washer 89, the hole of which fits snugly on screw 88, and a recess 90 in the wall of case 21 to receive the head of screw 88. This recess too is larger in a vertical direction than the head of screw 88.

This arrangement permits a precise vertical adjustment of the switch with respect to actuator-point 24, so that the trip-action will occur at exactly the desired moment, thus assuring uniformity of action. This adjustment is effected by sliding plate 86 up or down with respect to housing 22, the plate and the housing being removed from metal case 21 for this purpose. Plate 86 is then clamped to housing 22, by means of screw 88. To prevent this adjustment from being tampered with, it is customary to then cement the head of this screw, washer 89, and plate 86 together. The thus-adjusted plate and housing are then inserted in case 21, boss 87 of which then holds the adjusted assembly against vertical movement.

The apparatus operates as follows:

Assume that everything is in the position of Fig. 2. Shaft 55 rotates clockwise as shown in Fig. 2. The not-cut-away portion of shaft 55 thus moves downwards to the left, permitting spring 60 to force follower 59, and hence actuator 63—24, and hence plunger 23, downwards, against the resistance of spring 32 (which is less strong than spring 60). But before plunger 23 has moved down even approximately far enough to snap the switch from lower contact to upper contact, the following happens.

Inasmuch as Fig. 2 is viewed from the front, and Figs. 6 and 7 from the back, shaft 55 in the latter two figures is rotating counter-clockwise. The balls are moving to the left. Turn now to Fig. 10. The balls progress from the position there shown, to the unstable position at the peak of camway 71 shown in Fig. 11, meanwhile storing-up energy in spring 70, which tends to force spring-plate 69 toward cage 68.

Ball 72, immediately upon passing over the peak of camway 71, suddenly snaps to the left, rushing down the camway, under the influence of the stored-up energy in spring 70, carrying cage 68 with it, until further rotation of the cage is halted by it contacting stop 76. Ball 72 now occupies the position shown in Fig. 12. This abrupt rotation of cage 68 has rotated shaft 55 with it, almost instantaneously all the rest of the way to the position of Fig. 3, over-running the external actuating element. The resulting abrupt descent of follower 59, actuator 63—24, and plunger 23, quickly and positively snaps the switch into upper contact position.

The return movement operates similarly. Shaft 55 now rotates counter-clockwise in Fig. 3. The not-cut-away portion of shaft 55 moves to the right and upwards, thus forcing follower 59 upwards against the resistance of spring 60. Relieved of the downward pressure of follower 59, which had been acting through actuator 63—24, plunger 23 is forced upwards by spring 32. But before plunger 23 has moved up even approximately far enough to snap the switch from upper contact to lower contact, the following happens.

Shaft 55 is rotating clockwise in Figs. 6 and 7. The balls are moving to the right. They progress from the position shown in Fig. 12, to the unstable position at the peak of camway 71, meanwhile storing-up energy in spring 70, as before.

Ball 72, immediately upon passing over the peak of camway 71, suddenly snaps to the right, under the influence of the stored-up energy in spring 70, carrying cage 68 with it, until further rotation is halted by contact with stop 76. Ball 72 is now back where it started, in the position shown in Fig. 12. This abrupt rotation of cage 68 has rotated shaft 55 with it almost instantaneously all the rest of the way to the position of Fig. 2, over-running the external actuating element. The resulting abrupt ascent of follower 59, actuator 63—24, and plunger 23, quickly and positively snaps the switch into lower contact position.

Figure 10:
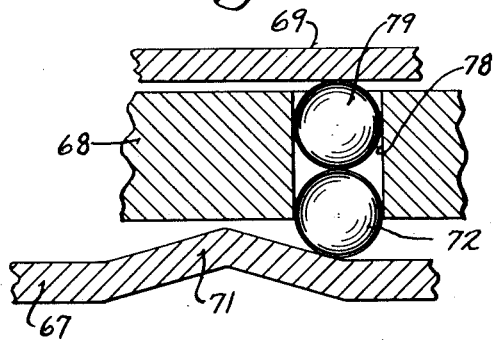
Fig. 10 is a much-enlarged horizontal section of a part of spring-plate, ball-cage, and cam-plate, and one pair of balls, in the position of Figs. 2, 4, 5, 6, and 7, viewed as though cut along the line 10—10 of Fig. 7.
Figure 11:
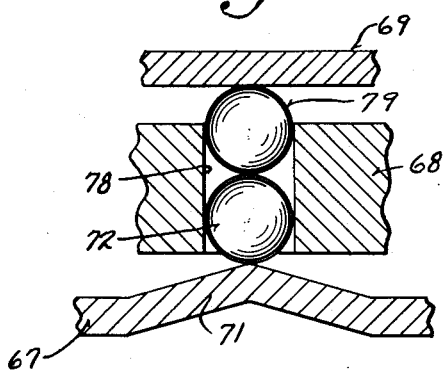
Fig. 11 is the same, but showing the parts with the balls at the peak of the cam, intermediate between their position in Fig. 10 and in Fig. 12.

During the travel of the balls from the position of Fig. 10 to the position of Fig. 12, and back again, the balls (due to their being in pairs or other even number) will roll on the camway and on the spring-plate and on each other, with almost negligible slippage, and resulting almost negligible friction, at these points of rolling contact and against the sides of the holes which carry them.

The combination of cam-plate 67, camways 71, cage 68, balls 72 and 79, spring-plate 69, and spring 70 has wider fields of use than merely in the setting the present complete structure. In such extended use the parts need not even be rotary.

In the first place, this combination constitutes broadly a mechanism for producing (when external actuation has carried the relative motion of camways and cage to a predetermined relative position) an abrupt snap-action relative motion of camways and cage, independent of the external actuation. This mechanism can be employed to actuate any of a large class of actuated mechanisms, with minimum friction, and hence minimum wear, and hence enduring precision.

In the second place, this combination constitutes a mechanical movement for converting a large displacement in one direction into small displacement in a direction perpendicular thereto. A large and rapid reciprocating or rotary motion can thereby with minute accuracy be employed to cause a very varied predetermined reciprocating motion perpendicular thereto, with minimum friction, and hence minimum wear, and hence enduring precision.

Now that one embodiment of the invention has been shown and described, and several variations thereof suggested, it is to be understood that the invention is not to be limited to the specific form or arrangement of parts herein shown and described.

I claim:

1. In a snap-action mechanism, the combination comprising: a support; a rotatable member, mounted on the support for reciprocating rotation with respect to the support; stop means, for limiting the rotation of the rotatable member in each direction; and means for deriving and storing-up energy from such rotation during at least a part of approximately the first half of such rotation in each direction, and for then abruptly releasing this stored energy during at least a part of approximately the second half of such rotation to enhance such rotation, said last-mentioned means comprising: a ball cage, disposed about the axis of the rotatable member, and fixed to said member, and having a plurality of holes extending therethrough substantially parallel to said axis; in each hole exactly two balls, of substantially equal diameter slightly less than that of the hole; a camway disposed about the axis of the rotatable member, and fixed to the support, and continuously engaging the adjacent ball of each of the sets, for moving the sets in unison substantially parallel to the axis of the rotatable member; said camway including a slope toward the ball cage, and an adjacent slope away from the ball cage, the juncture between the two slopes being at their ends nearest to the ball cage, and sharply defined; a ball track disposed about the axis of the rotatable member, and substantially non-rotational with respect to the support, and continuously engaging the other ball of each set and resilient means, carried by the support, for biasing the ball track toward the camway.

2. Mechanism according to claim 1, wherein there are exactly two ball-containing holes, diametrically located with respect to the axis.

3. In a snap-action mechanism, the combination comprising: a support; a rotatable member, mounted on the support for reciprocating rotation with respect to the support; stop means, for limiting the rotation of the rotatable member in each direction; and means for deriving and storing-up energy from such rotation during at least a part of approximately the first half of such rotation in each direction, and for then abruptly releasing this stored energy during at least a part of approximately the second half of such rotation to enhance the speed of such rotation, said last-mentioned means comprising: a ball cage, disposed about the axis of the rotatable member, and fixed to said member, and having a plurality of holes extending therethrough substantially parallel to said axis; in each hole exactly two balls, of diameter slightly less than that of the hole; a camway disposed about the axis, and fixed to the support, and continuously engaging the adjacent ball of each of the sets, for moving the sets in unison substantially parallel to the axis of the rotatable member; a ball track continuously engaging the other ball; and resilient means, for biasing the ball track toward the camway; characterized by including in combination therewith: a snap-action electric switch; and means, operatively connecting the rotatable member to said switch, for transmitting the snap-action of the rotatable member to actuate said switch; the parts being so proportioned and arranged that, during rotation of the rotatable member in either direction, the snap-over of the actuating mechanism occurs prior to the snap-over of the actuated switch.

References Cited in the file of this patent

UNITED STATES PATENTS

| 1,114,680 | Denhard | Oct. 20, 1914 |
| 1,183,376 | Hansen | May 16, 1916 |
| 1,264,473 | Baker | Apr. 30, 1918 |
| 1,410,855 | Veneria | Mar. 22, 1922 |
| 1,516,000 | Clark | Nov. 18, 1924 |
| 2,289,643 | Furnas | July 14, 1942 |
| 2,449,733 | Wilkening | Sept. 21, 1948 |
| 2,458,873 | Parker | Jan. 11, 1949 |
| 2,603,731 | Weiss et al. | July 15, 1952 |

FOREIGN PATENTS

| 140,145 | Austria | Jan. 10, 1935 |
| 716,967 | Great Britain | Oct. 20, 1954 |